US008188692B2

(12) United States Patent
Kumar

(10) Patent No.: US 8,188,692 B2
(45) Date of Patent: May 29, 2012

(54) PROPULSION SYSTEM

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 601 days.

(21) Appl. No.: 12/276,122

(22) Filed: Nov. 21, 2008

(65) Prior Publication Data

US 2010/0127563 A1 May 27, 2010

(51) Int. Cl.
H02P 3/18 (2006.01)
H02P 3/00 (2006.01)
H02P 1/00 (2006.01)
B61C 17/00 (2006.01)
B61L 3/22 (2006.01)

(52) U.S. Cl. ..... 318/376; 318/139; 318/375; 105/26.05; 246/167 R

(58) Field of Classification Search ................. 318/139, 318/375, 376; 105/26.05; 246/167 R
See application file for complete search history.

(56) References Cited

U.S. PATENT DOCUMENTS

| | | | | |
|---|---|---|---|---|
| 6,591,758 B2 * | 7/2003 | Kumar | .......................... | 105/35 |
| 6,612,245 B2 | 9/2003 | Kumar et al. | | |
| 6,615,118 B2 * | 9/2003 | Kumar | .......................... | 701/19 |
| 7,061,131 B2 * | 6/2006 | King et al. | .................... | 290/40 C |
| 7,137,344 B2 * | 11/2006 | Kumar et al. | .................... | 105/35 |
| 7,190,133 B2 | 3/2007 | King et al. | | |
| 7,325,498 B2 * | 2/2008 | Kumar et al. | .................... | 105/35 |
| 7,565,867 B2 * | 7/2009 | Donnelly et al. | ............. | 105/62.1 |
| 7,715,958 B2 * | 5/2010 | Kumar | .......................... | 701/22 |
| 7,723,932 B2 * | 5/2010 | King et al. | .................... | 318/139 |

* cited by examiner

*Primary Examiner* — Walter Benson
*Assistant Examiner* — Gabriel Agared
(74) *Attorney, Agent, or Firm* — Shawn McClintic; Alleman Hall McCoy Russell & Tuttle LLP

(57) ABSTRACT

A propulsion system is provided. The system includes: a first propulsion vehicle unit including a first tractive bank having at least one traction motor; a second propulsion vehicle unit including: a second tractive bank having at least one traction motor, a contactor electrically coupling the first propulsion vehicle unit and the second propulsion vehicle unit, and an electrical power modulation device coupled between the first tractive bank and the second tractive bank, the electrical power modulation device having an electrical current threshold that causes the electrical power modulation device to transition to an open state to reduce or prevent transfer of electrical power between the first propulsion unit and the second propulsion unit in response to an electrical current at the electrical power modulation device being above the electrical current threshold.

20 Claims, 4 Drawing Sheets

DECOUPLED-AC CONFIGURATION

DECOUPLED CONVERTER CONFIGURATION

INDIVIDUALLY DECOUPLED TM CONFIGURATION

PROPULSION SYSTEM

TECHNICAL FIELD

The invention includes embodiments that relate to a propulsion system.

DISCUSSION OF ART

Vehicles can include a plurality of traction motors connected to an electrical bus. The traction motors use the electrical power to provide tractive effort for propulsion. Further, the electrical bus can connect to more than one other traction motor, or traction motor bank, via a contactor. During operation of such a distributed propulsion system, traction motor degradation may occur. Degraded traction motors may cause an electrical current spike during use. It may be desirable to have a propulsion system that differs from those propulsion systems that are currently available.

BRIEF DESCRIPTION OF THE INVENTION

According to one embodiment, a propulsion system is described herein. For example, the system may include a first propulsion vehicle unit including a first tractive bank having at least one traction motor, the at least one traction motor receiving electrical power from an energy source to provide tractive effort to propel the system. A second propulsion vehicle unit may include a second tractive bank having at least one traction motor. A contactor electrically couples the first propulsion vehicle unit and the second propulsion vehicle unit. The contactor supplies electrical power from the energy source to the second tractive bank. An electrical power modulation device is coupled between the first tractive bank and the second tractive bank. The electrical power modulation device has an electrical current threshold that causes the electrical power modulation device to transition to an open state to reduce or prevent transfer of electrical power between the first propulsion unit and the second propulsion unit in response to an electrical current at the electrical power modulation device being above the electrical current threshold.

Because the electrical power modulation device may transition to an open state based on an increased electrical current level at the electrical power modulation device as a result of traction motor degradation, the tractive bank of the degraded tractive motor may be isolated from the other tractive bank of the distributed propulsion system. As such, system-wide degradation may be reduced or avoided upon degradation of a tractive motor. And, electrical power may be distributed to other operational traction motors to provide tractive effort to propel the distributed propulsion system.

In another embodiment, the system includes a first propulsion vehicle unit including a first tractive bank having a first electrical bus that receives electrical power from the energy source. A first power modulation device is coupled to the first electrical bus. A first traction motor in the first tractive bank provides tractive effort to propel the distributed propulsion system, and is coupled to the first power modulation device. The first power modulation device has an electrical current threshold that causes the first power modulation device to transition to an open state to isolate the first traction motor from the first electrical bus in response to an electrical current at the first power modulation device above the electrical current threshold. A second propulsion vehicle unit includes a second tractive bank having a second electrical bus. A second power modulation device is coupled to the second electrical bus. And, a second traction motor of the second tractive bank provides tractive effort to propel the distributed propulsion system, and is coupled to the second power modulation device. The second power modulation device has an electrical current threshold that causes the second power modulation device to transition to an open state to isolate the second traction motor from the second electrical bus in response to an electrical current at the second power modulation device being above the electrical current threshold. A contactor is coupled between the first propulsion vehicle unit and the second propulsion vehicle unit to transfer electrical power between the first propulsion vehicle unit and the second propulsion unit.

The summary above introduces a selection of concepts in simplified form that are further described in the detailed description. It does not identify key or essential features of the claimed subject matter, the scope of which is defined by the claims that follow the detailed description. Furthermore, the claimed subject matter is not limited to implementations that solve any disadvantages noted above or in any part of this disclosure.

DETAILED DESCRIPTION

The subject matter disclosed herein relates to propulsion systems. Embodiments of the invention may relate to mechanisms that may be utilized to distribute tractive effort among a plurality of tractive units of a distributed propulsion vehicle system. For ease of illustration, a locomotive is selected as a working example of a vehicle amenable for use with embodiments of the invention.

As used herein, a contactor may include electrical buses, bars, and/or cables to transfer electrical power. Contactors may be used to electrically couple vehicle units of a distributed propulsion vehicle system. A traction motor is a type of electric motor that can be used to power the driving wheels of a vehicle such as a railroad locomotive, electrical multi-unit train (such as a subway or light rail vehicle train), a tram, or an automobile. An electrical power source, unless context or language indicates otherwise, can include a prime mover coupled to an alternator or generator, for example. A prime mover can refer to a fuel converter or heat engine that drives the generator or alternator to produce electrical power.

Figure 1:
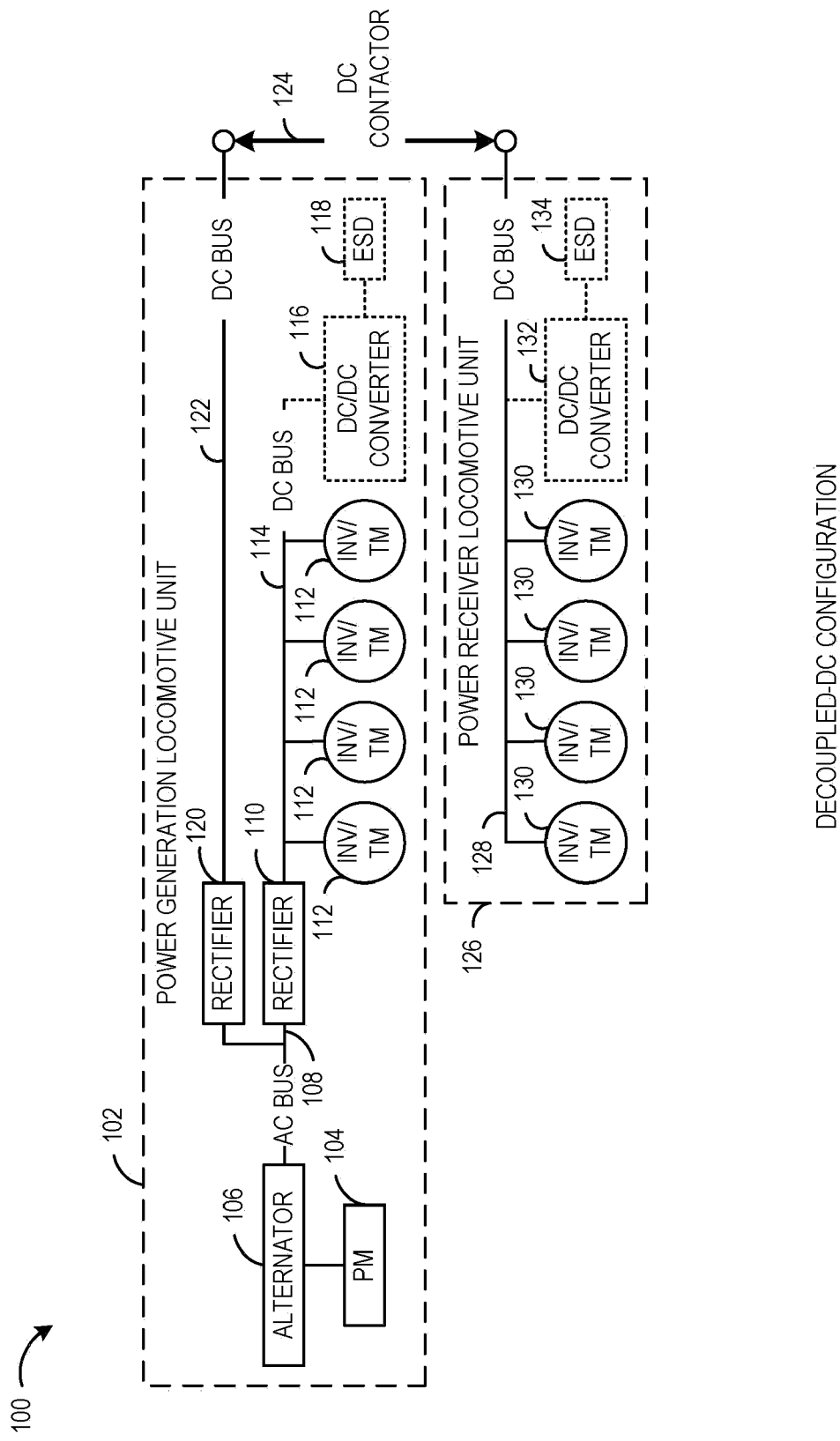
FIG. 1 is a schematic diagram of a decoupled-DC mated locomotive vehicle configuration.

FIG. 1 is a schematic diagram of a locomotive vehicle system 100 that includes an embodiment of the invention. The locomotive vehicle system 100 includes a power generation locomotive unit 102 and a power receiver locomotive unit 126 to provide tractive effort to propel the locomotive vehicle system 100. The power generation locomotive unit 102 and the power receiver locomotive unit 126 may be electrically coupled through a direct current (DC) contactor 124 such that DC electrical power may be transferred between the power generation locomotive unit 102 and the power receiver locomotive unit 126. In the illustrated embodiment, the DC contactor electrically linking the locomotive units is connected such that electrical power transferred between the locomotive units is decoupled from the traction motors of the power generation locomotive unit in what may be referred to as a decoupled-DC mated locomotive vehicle configuration.

The power generation locomotive unit 102 may include a prime mover 104 to generate power to be distributed to traction motors 112 of the power generation locomotive unit 102 as well as traction motors 130 of the power receiver locomotive unit 126 for propulsion of the locomotive vehicle system 100. A suitable locomotive vehicle system may be a diesel-electric locomotive that includes a diesel engine, which may act as the prime mover. However, engine configurations other than a diesel engine may be implemented in the locomotive vehicle system, such as a gasoline engine, for example. In some embodiments, the locomotive vehicle system may be powered by way-side power and the engine may be omitted (e.g., electric locomotives).

The prime mover 104 generates torque output that drives an alternator 106. The alternator 106 produces electrical power that is distributed to various electrical components by an AC (alternating current) bus 108 connected to the output of the alternator 106. A rectifier 110 connected to the AC bus 108 converts AC electrical power into DC electrical power that is supplied to a DC bus 114 which is connected to the output of the rectifier 10. The traction motors 112 receive DC electrical power from the DC bus 114 to generate tractive effort in order to propel the locomotive vehicle system 100. In the illustrated embodiment, four traction motors per tractive bank of a locomotive unit are illustrated. In other embodiments, other numbers of traction motors may provide tractive effort to propel the locomotive vehicle system. For example, different locomotive units may each have the same number of traction motors. As another example, different locomotive units may each have a different number of traction motors.

Each of the traction motors 112 may include an electrical power modulation device configured to modify a parameter of the electrical power provided to the traction motors, such as voltage or frequency, for example. In some embodiments, the electrical power modulation device may include an inverter. In one example, the inverter converts DC electrical power from the DC bus to AC electrical power that is supplied to an AC traction motor. In some embodiments, the electrical power modulation device may include a converter. In one example, the converter modifies the voltage of DC electrical power from the DC bus to a different voltage that is supplied to DC traction motor.

Furthermore, in some embodiments, the locomotive vehicle system 100 is a hybrid-electric system in which the traction motors 112 act as generators to provide dynamic braking to slow the locomotive vehicle system 100. In particular, during dynamic braking operation, the traction motors 112 provide torque in a direction that is opposite from the rolling direction of the locomotive vehicle system 100 which, in turn, generates electrical power that is sent to the DC bus 114. A converter 116 modifies or meters the DC electrical power from the DC bus 114 to an energy storage device 118. Further, under some conditions, the energy storage device 118 may supply electrical power to the traction motors 112 for propulsion. The energy storage device 118 may include one or more of a battery, a capacitor, a flywheel, or a pressurizable vessel. Under various conditions, the traction motors 112 may be supplied with electrical power from by the prime mover 104, the energy storage device 118, an energy storage device of another locomotive vehicle unit, or by some combination of the foregoing.

Under some conditions, electrical power may be diverted from one of the electrical buses to a grid (not shown). The grid may include resistor banks to dissipate the electrical power in the form of heat. In particular, the grid includes stacks of resistive elements connected in series to one of the electrical buses. The grid may be positioned proximate to the ceiling of a hood of a locomotive unit in order to facilitate air cooling and heat dissipation from the grid. Alternatively, other suitable grid configurations may be implemented. As an example, during an extended braking condition in which the energy storage device is filled to capacity with electrical power generated by dynamic braking, additional electrical power beyond that which the battery is capable to uptake may be diverted to the grid to be dissipated. Or, the electrical energy may be offloaded via a trolley line, or the like, to an off-board energy storage system.

Continuing with FIG. 1, the power generation locomotive unit 102 may generate electrical power through operation of the prime mover 104 that may be distributed to the power receiver locomotive unit 126 through the DC contactor 124. The DC contactor 124 is connected to the power generation locomotive unit 102 such that electrical power transferred to the DC contactor 124 is decoupled from power supplied to the traction motors 112 by an electrical power modulation device. In particular, a rectifier 120 coupled to the AC bus 108 converts AC electrical power to DC electrical power that is supplied to DC bus 122. The DC bus 128 of the power receiver locomotive unit 126 receives DC electrical power from the DC bus 122 through the DC contactor 124 to power the traction motors 130. As such, tractive effort to propel the locomotive vehicle system 100 may be provided by traction motors of different locomotive units. An electrical power modulation device may include a diode/rectifier, an inverter, a converter, or some other suitable device to modulate electrical power.

In the above described decoupled-DC mated locomotive vehicle configuration, the rectifier 120 and the rectifier 110 may act as buffers to insolate the traction motors 112 and the traction motors 130 to provide protection from system-wide degradation of the locomotive vehicle system 100. In other words, if one tractive bank of traction motors incurs degradation causing an increase or spike in current, the corresponding rectifier may have a current threshold that causes the rectifier to transition to an open state to isolate the high current to the local electrical bus to which the degraded traction motor is connected. By isolating the current produced by the traction motor degradation to the local electrical bus, other tractive banks of traction motors may still receive electrical power to continue operation without incurring system-wide degradation. The above described configuration may be expanded to include additional power generation locomotive units and/or power receiver locomotive units to provide additional distributed tractive effort.

Figure 2:
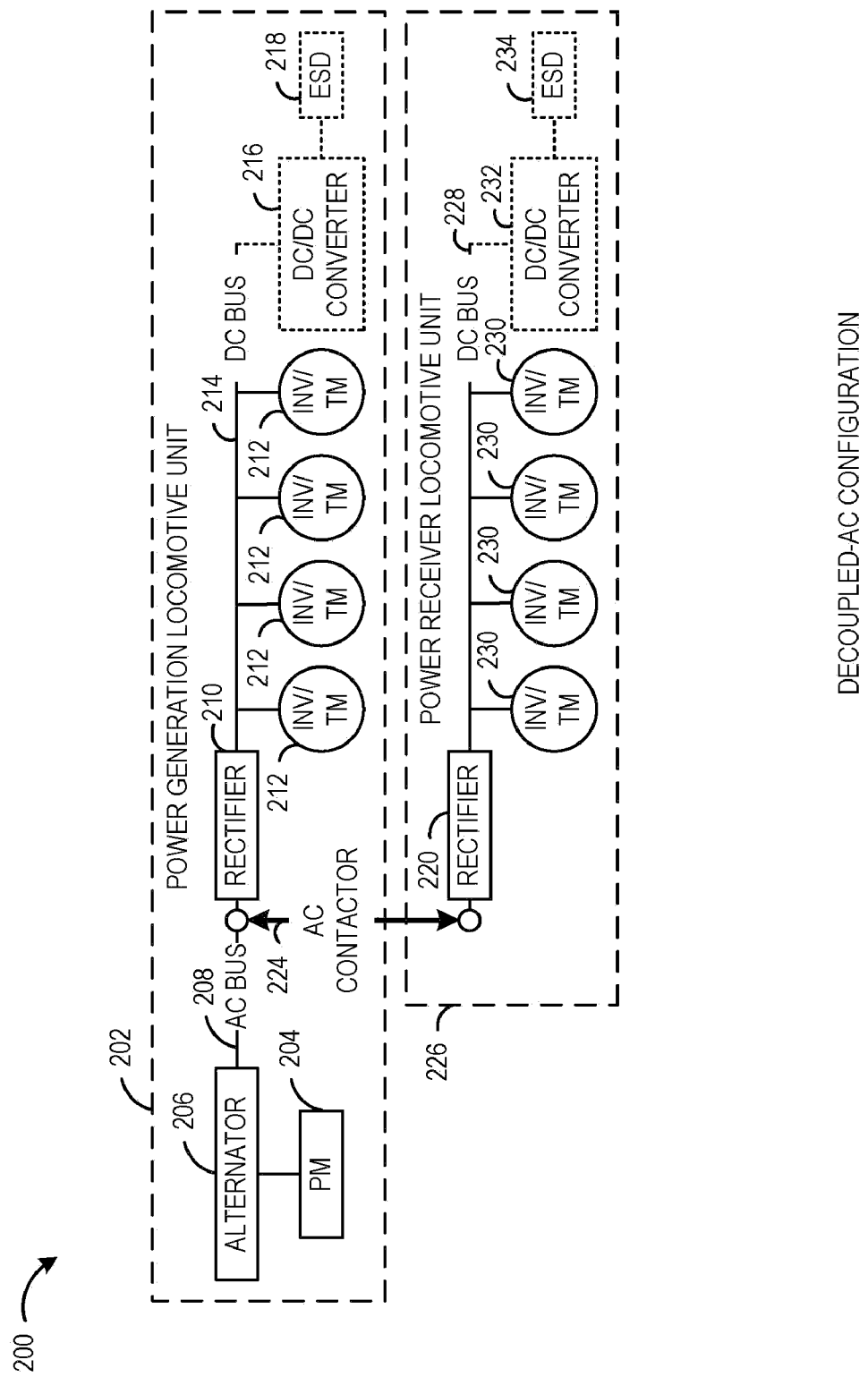
FIG. 2 is a schematic diagram of a decoupled-AC mated locomotive vehicle configuration.

FIG. 2 schematically shows another embodiment of a locomotive vehicle system 200. The locomotive vehicle system 200 includes a plurality of elements having the same function or function similar to the locomotive vehicle system 100. Such elements are labeled with the same reference number however the "1" is replaced with a "2". Like the locomotive vehicle system 100, the locomotive vehicle system 200 includes a power generation locomotive unit 202 and a power receiver locomotive unit 226 to provide tractive effort to propel the locomotive vehicle system 200. The power generation locomotive unit 202 and the power receiver locomotive unit 226 may be electrically coupled through an AC contactor 224 so that AC electrical power may be transferred between the power generation locomotive unit 202 and the power receiver locomotive unit 226 in what may be referred to as a decupled-AC mated locomotive vehicle configuration. In particular, the AC contactor 224 may be connected to the AC bus 208. The AC electrical power transferred through the AC contactor 224 to the power receiver locomotive unit 226 is converted to DC electrical power by the rectifier 220 and supplied to the traction motors 230 to provide tractive effort to propel the locomotive vehicle system 200.

In the decoupled-DC mated locomotive vehicle configuration of FIG. 1, DC electrical power is transferred between the locomotive vehicle units by a series connection. The use of inductors and capacitors in the DC series connection circuit generates resonance currents between the locomotive vehicle units that generate oscillations that cause noise or signal distortion. In the decoupled-AC mated locomotive vehicle configuration of FIG. 2, the AC series connection circuit includes fewer capacitors relative to the DC series connection circuit that results in a reduction in, or elimination of, the resonance current. As such, the decoupled-AC mated locomotive vehicle configuration may provide improved transmission signal clarity.

Furthermore, the decoupled-AC mated locomotive vehicle configuration may provide a reduction in manufacturing costs relative to the decoupled-DC mated locomotive vehicle configuration. The economic benefit may be realized where an AC contactor costs less than a DC contactor.

Figure 3:
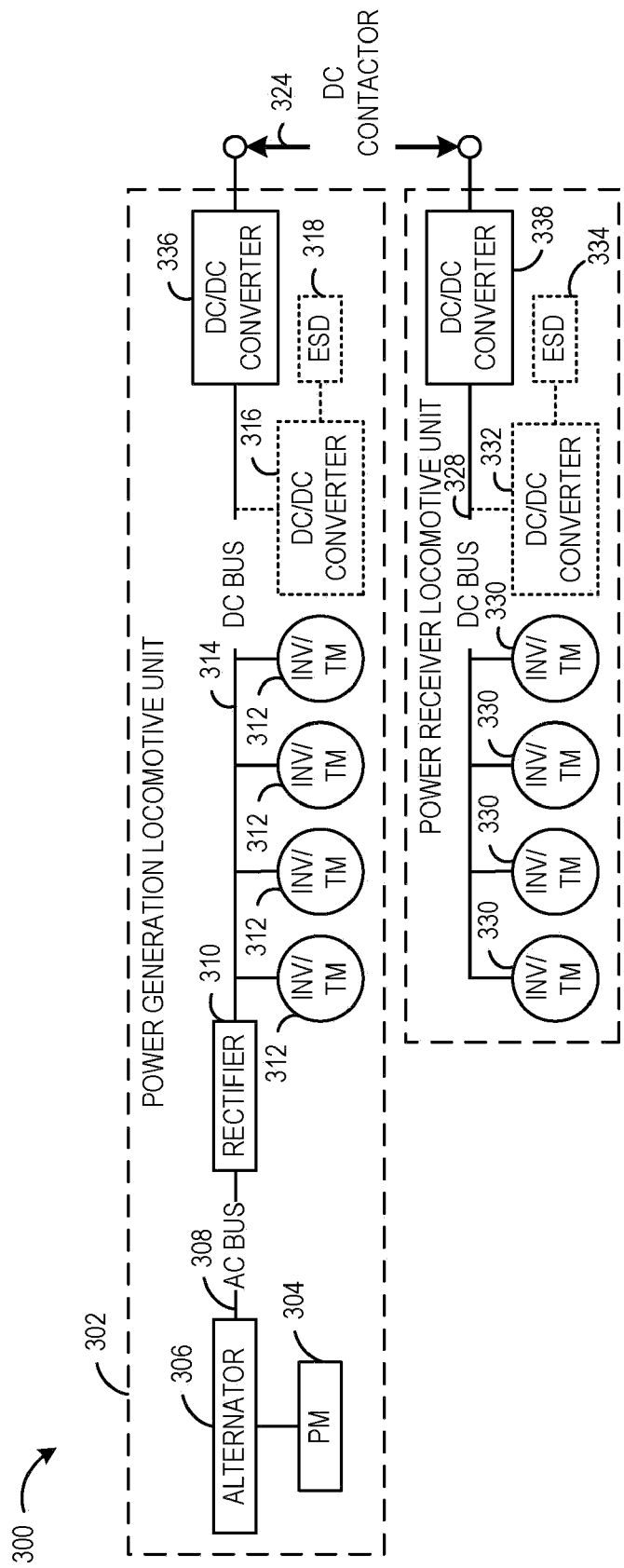
FIG. 3 is a schematic diagram of a decoupled-converter mated locomotive vehicle configuration.

FIG. 3 schematically shows another embodiment of a locomotive vehicle system 300, which may be referred to as a decupled-converter mated locomotive vehicle configuration. The locomotive vehicle system 300 includes a plurality of elements having the same function or function similar to the locomotive vehicle system 100. Such elements are labeled with the same reference number however the "1" is replaced with a "3". Like the locomotive vehicle system 100, the locomotive vehicle system 300 includes a power generation locomotive unit 302 and a power receiver locomotive unit 326 to provide tractive effort to propel the locomotive vehicle system 300. The power generation locomotive unit 302 includes a DC/DC converter 336 coupled to the DC bus 314. The DC/DC converter 336 modifies or meters DC electrical power to the power receiver locomotive unit 326 through DC contactor 324. The power receiver locomotive unit 326 includes a DC/DC converter 338 coupled to the DC bus 328. The DC/DC converter 338 modifies or meters DC electrical power supplied to the DC bus 328.

In the illustrated embodiment, the DC/DC converter 336 acts as a buffer to isolate the tractive bank of traction motors 312 of the power generation locomotive unit 302 in case of traction motor degradation that results in a current spike. Likewise, the DC/DC converter 338 acts as a buffer to isolate the tractive bank of traction motors 330 of the power receiver locomotive unit 326. The isolation of the tractive banks of traction motors provided by the DC/DC converter allows for operation of the traction motors in at least one of the locomotive units following traction degradation in a tractive bank of a locomotive unit.

Furthermore, the decoupled-converter mated locomotive vehicle configuration allows for selective distribution or adjustment of electrical power between the power generation locomotive unit 302 and the power receiver locomotive unit 326. For example, electrical power generated from operation of prime mover 304 is supplied to the DC bus 314 and the DC/DC converter 336 may be adjusted to transfer some, none, or substantially all electrical power to the power receiver locomotive unit 326 through the DC contactor 324 based on operating conditions.

In one example, operating conditions dictate a load of 1200 volts to propel the locomotive vehicle system. The prime mover generates 1400 volts of electrical power, 1200 volts of which are directed to the traction motors 312 to propel the locomotive vehicle system. Meanwhile, the DC/DC converter 336 is controlled to transfer 200 volts to the power receiver locomotive unit 326 to power auxiliary components (e.g., coolant system) coupled to the DC bus 328. As operation conditions change, the DC/DC converter may be adjusted to meter a different voltage to the power receiver locomotive unit 326.

The decoupled-converter mated locomotive vehicle configuration may be particularly applicable to embodiments of the locomotive vehicle system that are hybrid electric. In particular, the DC/DC converters may facilitate two-way transfer of electrical power between the power generation locomotive unit and the power receiver locomotive unit. For example, electrical power stored in the energy storage device 334 may be metered to the power generation locomotive unit 302 by the DC/DC converter 338 to power the tractive bank of the traction motors 312. As another example, electrical power stored in the energy storage device 318 may be metered to the power receiver locomotive unit 326 by the DC/DC converter 336 to power the tractive bank of the traction motors 330. The DC/DC converters allow for electrical power stored in the energy storage units to be distributed to traction motors in different locomotive units to supplement or replace electrical power generated by operation of the prime mover which resulting in an increase in operating efficiency and fuel economy in some applications (e.g., diesel). In some embodiments, one DC/DC converter may be utilized to meter electrical power instead of multiple DC/DC converters. For example, a DC/DC converter may be located on the power generation locomotive unit to meter power to and from other vehicle units.

Figure 4:
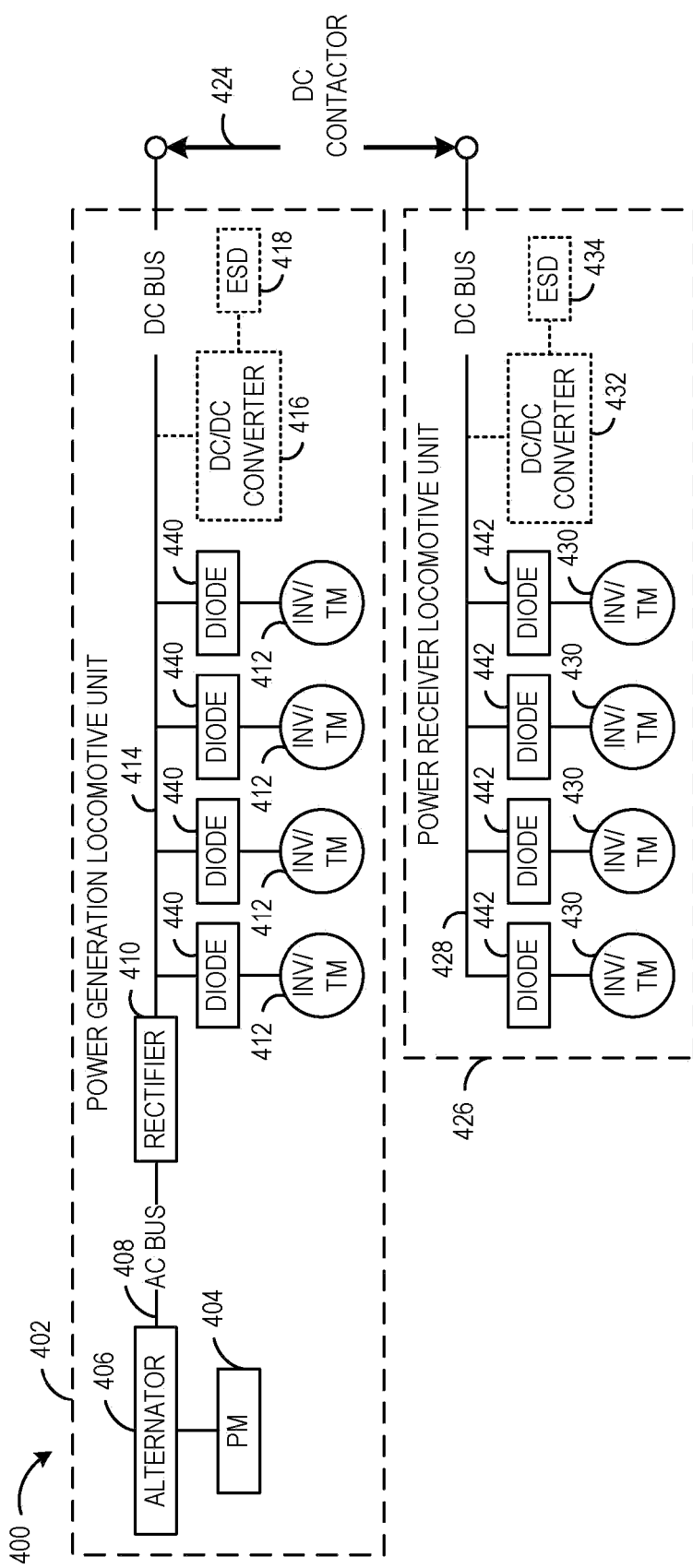
FIG. 4 is a schematic diagram of an individually-decoupled-traction-motor mated locomotive vehicle configuration.

FIG. 4 schematically shows another embodiment of a locomotive vehicle system 400, which may be referred to as an individually decoupled traction motor mated locomotive vehicle configuration. The locomotive vehicle system 400 includes a plurality of elements having the same function or function similar to locomotive vehicle system 100. Such elements are labeled with the same reference number however the "1" is replaced with a "4". Like the locomotive vehicle system 100, the locomotive vehicle system 400 includes a power generation locomotive unit 402 and a power receiver locomotive unit 426 to provide tractive effort to propel the locomotive vehicle system 400. In the power generation locomotive unit 402, for each of the traction motors 412, a diode 440 may be connected intermediate the DC bus 414 and the traction motor. Likewise, in the power receiver locomotive unit 426, for each of the traction motors 430, a diode 442 may be connected intermediate the DC bus 428 and the traction motor.

In the individually decoupled traction motor mated locomotive vehicle configuration, each traction motor of the power generation locomotive unit and the power receiver locomotive unit may be individually isolated from the rest of the tractive bank and the rest of the locomotive vehicle system by a diode prevents a current spike caused by traction motor degradation from traveling along the associated electrical bus. In particular, during operation, tolerances of the diode may allow for electrical power to flow to and from a traction motor depending on a motoring, dynamic barking, or other operating condition. However, upon occurrence of traction motor degradation, electrical current may increase beyond the operating tolerance of the diode. Accordingly, the diode may transition to an open state to isolate the current from the other traction motors of the tractive bank as well as from other locomotive units. By isolating each traction motor, a tractive bank of traction motors may continue to be operational even if one of the traction motors of the tractive bank degrades.

Moreover, the individual traction motor isolation may mitigate or prevent a current spike from spreading between locomotive units, thus preventing system-wide degradation. Furthermore, the individual isolation of the traction motors by the diodes may reduce or eliminate resonance currents that may otherwise occur between locomotive units in DC applications.

It will be appreciated that in some embodiments, any or all rectifiers may be incorporated into converters that also include inverters which may be used to convert DC electrical power to AC electrical power in order to facilitate two-way electrical power transfer. The use of converters may be particularly applicable to hybrid implementations.

Note that the example control and estimation routines and/or methods included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

This written description uses examples to disclose the invention, including the best mode, and also to enable any person of ordinary skill in the art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A propulsion system, comprising:
a first propulsion vehicle unit comprising: a first tractive bank having at least one traction motor, the traction motor receiving electrical power from an electrical power source to provide tractive effort to propel the system;
a second propulsion vehicle unit comprising: a second tractive bank having at least one traction motor;
a contactor electrically coupling the first propulsion vehicle unit and the second propulsion vehicle unit, the contactor reversibly supplying electrical power from the electrical power source to the second tractive bank; and
an electrical power modulation device coupled between the first tractive bank and the second tractive bank, the electrical power modulation device having an electrical current threshold that causes the electrical power modulation device to transition to an open state to reduce or prevent transfer of electrical power between the first propulsion unit and the second propulsion unit in response to an electrical current at the electrical power modulation device being above the electrical current threshold.

2. The system of claim 1, wherein the contactor is an alternating current contactor.

3. The system of claim 1, wherein the contactor is a direct current contactor.

4. The system of claim 1, wherein the electrical power modulation device is a rectifier.

5. The system of claim 1, wherein the electrical power modulation device is a direct current to direct current converter.

6. The system of claim 1, wherein each of the first tractive bank and the second tractive bank comprises an energy storage device to store electrical power produced by the at least one tractive motor during a dynamic braking operation.

7. The system of claim 1, wherein the electrical power source comprises a prime mover that is a diesel engine configured to produce torque output that is converted to electrical power by an alternator.

8. The system of claim 1, wherein the electrical power source provides alternating current electrical power, and wherein the first propulsion vehicle unit further comprises a rectifier to convert the alternating current electrical power to direct current electrical power, the rectifier being configured to supply the direct current electrical power to the first tractive bank.

9. A distributed propulsion system comprising:
a first propulsion vehicle unit comprising: a prime mover operational to generate electrical power, an alternating current electrical bus to receive electrical power generated by operation of the prime mover, a rectifier coupled to the alternating current electrical bus to convert alternating current electrical power to direct current electrical power, the rectifier having an electrical current threshold that causes the rectifier to transition to an open state to substantially prevent transfer of electrical power from the alternating current electrical bus, a first direct current electrical bus coupled to an output of the rectifier, and a first tractive bank having at least one traction motor to provide tractive effort to propel the distributed propulsion system coupled to the first direct current electrical bus;
a second propulsion vehicle unit comprising: a second direct current electrical bus, and a second tractive bank having at least one traction motor to provide tractive effort to propel the distributed propulsion system coupled to the second direct current electrical bus;
a contactor coupled between the first propulsion vehicle unit and the second propulsion vehicle unit to transfer electrical power between the first propulsion vehicle unit and the second propulsion vehicle unit; and
an electrical power modulation device coupled between the first propulsion vehicle unit and the second propulsion vehicle unit, the electrical power modulation device having an electrical current threshold that causes the electrical power modulation device to transition to an open state to substantially prevent transfer of electrical power between the first propulsion vehicle unit and the second propulsion vehicle unit in response to an electrical current at the electrical power modulation device being above the electrical current threshold.

10. The system of claim 9, wherein the contactor is a direct current contactor.

11. The system of claim 10, wherein the electrical power modulation device is coupled to the alternating current electrical bus of the first propulsion unit, and wherein the electrical power modulation device comprises a rectifier to convert alternating current to direct current to be supplied to the direct current contactor.

12. The system of claim 10, wherein the electrical power modulation device is coupled to the first direct current electrical bus, and wherein the electrical power modulation device comprises a direct current to direct current converter configured to meter an amount of direct current electrical power to the direct current contactor or the first direct current electrical bus.

13. The system of claim 12, wherein the second propulsion vehicle unit further comprises a second direct current to direct current converter coupled between the second direct current electrical bus and the direct current contactor, the second direct current to direct current converter being configured to meter an amount of electrical power to the second direct current electrical bus or the direct current contactor.

14. The system of claim 9, wherein the contactor is an alternating current contactor coupled to the alternating current electrical bus, and wherein the electrical power modulation device is coupled between the alternating current contactor and the second direct current electrical bus to convert alternating current into direct current to be supplied to the second direct current electrical bus.

15. The system of claim 9, wherein the first propulsion vehicle unit further comprises a first energy storage device, and a first direct current to direct current converter coupled to the first direct current electrical bus to meter electrical power to the first energy storage device and wherein the second propulsion vehicle unit further comprises a second energy storage device, and a second direct current to direct current converter coupled to the second direct current electrical bus to meter electrical power to the second energy storage device.

16. The system of claim 9, wherein the prime mover is a diesel engine to produce torque output supplied to an alternator coupled to the output of the diesel engine, the alternator converting the torque output into alternating current electrical power supplied to the alternating current electrical bus.

17. The system of claim 9, wherein the at least one traction motor of the first tractive bank is an alternating current traction motor connected to the first direct current electrical bus via a first inverter, and wherein the at least one traction motor of the second tractive bank is an alternating current traction motor connected to the second direct current electrical bus via a second inverter.

18. A propulsion system, comprising:
 a first propulsion vehicle unit comprising: a prime mover operational to generate electrical power, a first tractive bank having a first electrical bus that receives electrical power generated by the prime mover, a first power modulation device coupled to the first electrical bus, and a first traction motor to provide tractive effort to propel the distributed propulsion system coupled to the first power modulation device, wherein the first power modulation device has an electrical current threshold that causes the first power modulation device to transition to an open state to isolate the first traction motor from the first electrical bus in response to an electrical current at the first power modulation device above the electrical current threshold;
 a second propulsion vehicle unit comprising: a second tractive bank having a second electrical bus, a second power modulation device coupled to the second electrical bus, and a second traction motor to provide tractive effort to propel the distributed propulsion system coupled to the second power modulation device; wherein the second power modulation device has an electrical current threshold that causes the second power modulation device to transition to an open state to isolate the second traction motor from the second electrical bus in response to an electrical current at the second power modulation device being above the electrical current threshold; and
 a contactor coupled between the first propulsion vehicle unit and the second propulsion vehicle unit to transfer electrical power between the first propulsion vehicle unit and the second propulsion unit.

19. The system of claim 18, wherein the contactor is a direct current contactor coupled between the first electrical bus and the second electrical bus.

20. The system of claim 18, wherein the first propulsion vehicle unit further comprises a first energy storage device, and a first direct current to direct current converter coupled to the first electrical bus to meter electrical power to the first energy storage device and wherein the second propulsion vehicle unit further comprises a second energy storage device, and a second direct current to direct current converter coupled to the second electrical bus to meter electrical power to the second energy storage device.

* * * * *